United States Patent
Wakatsuki

[19]

[11] Patent Number: 6,099,005
[45] Date of Patent: *Aug. 8, 2000

[54] REAR SUSPENSION SYSTEM OF AUTOMOBILE DISCRIMINATIVE OF ROAD IRREGULARITIES AND WHEEL BRAKING

[75] Inventor: Hideaki Wakatsuki, Toyota, Japan

[73] Assignee: Toyota Jidosha Kabushiki Kaisha, Toyota, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/862,175

[22] Filed: May 22, 1997

[30] Foreign Application Priority Data

May 31, 1996 [JP] Japan ................................. 8-159221

[51] Int. Cl.⁷ ................................................. B60G 7/00
[52] U.S. Cl. ................................................. 280/124.135
[58] Field of Search ................... 280/124.125, 124.134, 280/124.135, 124.136

[56] References Cited

U.S. PATENT DOCUMENTS

| 4,157,840 | 6/1979 | Kroniger et al. ....................... 280/688 |
| 4,709,935 | 12/1987 | Takizawa ................................ 280/91 |
| 4,714,270 | 12/1987 | Rumpel . | |
| 4,720,120 | 1/1988 | Shibahata ............................... 280/671 |
| 5,845,926 | 12/1998 | Davis et al. ........................... 280/690 |

FOREIGN PATENT DOCUMENTS

| 40 08 465 A1 | 4/1991 | Germany . |
| 53-47626 | 4/1978 | Japan . |
| 61-181707 | 8/1986 | Japan . |

*Primary Examiner*—Lanna Mai
*Assistant Examiner*—Faye M. Fleming
*Attorney, Agent, or Firm*—Oliff & Berridge, PLC

[57] ABSTRACT

In a rear suspension system of an automobile having a general construction of the double wishbone type including a lower arm pivotably connected with an axle hub at a position below an axle axis via front and rear outboard pivot joints and with a vehicle frame via front and rear inboard pivot joints, with the rear inboard pivot joint being positioned substantially inboard relative to the front inboard pivot joint, with each of the pivot joints including an elastic bush allowing a slight elastic resiliency of the joint in three dimensional directions, at least one of the bushes of the front inboard and front and rear outboard pivot joints has a non-uniformity of modulus of elasticity as viewed in a cross section perpendicular to its pivot axis such that the modulus of elasticity is lower along a first inclination against horizontality of ascending toward outboard than along a second against horizontality of descending toward outboard.

5 Claims, 5 Drawing Sheets

REAR SUSPENSION SYSTEM OF AUTOMOBILE DISCRIMINATIVE OF ROAD IRREGULARITIES AND WHEEL BRAKING

BACKGROUND OF THE INVENTION

1. Field of the Invention

The present invention relates generally to a suspension system of a vehicle such as an automobile, and more particularly, to an improvement of a double wishbone type suspension system of a rear wheel of an automobile so as to operate with discrimination of road irregularities and braking of the wheel.

2. Description of the Prior Art

As a rear wheel suspension system of automobiles there is known a modified double wishbone type suspension system having an external appearance such as somewhat diagrammatically shown in FIGS. 1 and 3 of the present application in plan and perspective views, respectively, though these figures show indeed an embodiment of the present invention which is embodied in certain details of the illustrated construction for an improvement of the wheel alignment performance of such a suspension system, as will be appreciated hereinbelow. In these figures, 10 is an axle hub for supporting a rear right wheel 12 of an automobile, and is supported from a vehicle frame 22 by a lower arm 18 and an upper arm 16.

As will be noted from the figures, in such a suspension construction, the inboard end of a rear leg 18b of the generally A-shaped lower arm 18 is shifted substantially inboard relative to the inboard end of a front leg 18a of the lower arm 18, thereby defining a common inboard pivot axis 28 connecting the centers of the front and rear inboard ends of the lower arm 18 substantially inclined with respect to the longitudinal direction of the vehicle, such as to define an angle θ. The rear suspension of this type is advantageous in providing a compact rear frame construction of an automobile having a flush back body style. However, although the inboard end of the front leg 18a is pivotably connected with the vehicle body 22 via a pivot joint 26 having a pivot axis coincident with the common pivot axis 28, it is considered to arrange a pivot joint 30 for pivotably mounting the inboard end of the rear leg 18b to have a pivot axis 32 oriented in the longitudinal direction of the vehicle in order to ensure the longitudinal alignment of the wheel 12 during as much bounding and rebounding movement as possible around a neutral position thereof. Therefore, in order for such a suspension system to be operable to allow the bounding and rebounding movement of the wheel, the pivot joints 26 and 30 must each incorporate an elastic bush which allows certain three dimensional movements between the members joined thereby.

As a result, as will be seen in FIG. 2, when the axle hub 10 is applied with a backward force F due to irregularities of road surface or braking of the wheel 12, the front inboard end of the lower arm 18 supported by the pivot joint 26 is shifted along the common pivot axis 28, while the rear inboard end of the lower arm 18 supported by the pivot joint 30 is shifted along the pivot axis 32, so that the lower arm 18, and the axle hub 10 as well, is turned counter-clockwise around a point O3 defined as a point of intersection of a straight line L1 extended from the center O1 of the pivot joint 26 to be perpendicular to the pivot axis 28 and a straight line L2 extended from the center O2 of the pivot joint 30 to be perpendicular to the pivot axis 32, thereby causing a toeing in of the wheel 12.

A toeing in of the rear wheels during a braking of the vehicle is desirable, in order to compensate for a decrease of the load on the rear wheels during the braking due to a forward shifting of the load balance on the four wheels, while, since a pair of right and left wheels will be toed in generally for a same absolute angle due to the braking, the running stability of the vehicle will not be damaged. However, a toeing in of the wheel according to the above-mentioned mechanism, when caused by irregularities of road surface, will often occur at only one of the right and left wheels, getting undesirable for ensuring the running stability of the vehicle, while providing no such advantage as available in the case of braking.

SUMMARY OF THE INVENTION

In view of the above, it is a primary object of the present invention to improve such a modified double wishbone type rear suspension system so that it meets with longitudinal forces applied thereto by road irregularities and wheel braking with a discrimination therebetween, so as to suppress a deviation of wheel alignment against a longitudinal force due to road irregularities, while allowing a deviation of the wheel alignment for a longitudinal force due to wheel braking so as to effectively utilize the deviation for a better braking performance of the vehicle.

According to the present invention, the above-mentioned primary object is accomplished by a rear suspension system of an automobile, comprising:

an axle hub including a rotatable axle for supporting either a rear right or a rear left wheel and a brake means for selectively braking rotation of said axle;

a substantially horizontal lower arm having front and rear outboard ends each pivotably connected with said axle hub at a position below said axle via a pivot joint so as to allow a relative pivotal movement therebetween around a substantially horizontal common pivot axis connecting central points of said front and rear outboard pivot joints, and front and rear inboard ends each pivotably connected with a vehicle frame via a pivot joint so as to allow a relative pivotal movement therebetween around a substantially horizontal common pivot axis connecting central points of said front and rear inboard pivot joints, said rear inboard pivot joint being positioned substantially inboard relative to said front inboard pivot joint, said front inboard pivot joint having a pivot axis substantially aligned with said common pivot axis connecting the central points of said front and rear inboard pivot joints, while said rear inboard pivot joint having a pivot axis substantially extending in the longitudinal direction of the automobile, with each of said pivot joints including an elastic bush allowing a slight elastic resiliency in three dimensional directions; and a substantially horizontal upper arm having an outboard end pivotably connected with said axle hub via a pivot joint so as to allow a relative pivotal movement therebetween around a substantially horizontal pivot axis and an inboard end pivotably connected with the vehicle frame via a pivot joint so as to allow a relative pivotal movement therebetween around a substantially horizontal pivot axis;

wherein at least one of said bushes of said front inboard pivot joint and said front and rear outboard pivot joints of said lower arm has a non-uniformity of modulus of elasticity as viewed in a cross section perpendicular to the pivot axis thereof such that the modulus of elasticity is lower along a first inclination against horizontality of ascending toward outboard than along a second inclination of descending toward outboard.

The above-mentioned construction of the suspension system of the present invention utilizes the fact that, when a backward force is applied to the wheel by irregularities of road surface, the force acts substantially at the central axis of the axle as acting above the lower arm, while, when a backward force is applied to the wheel by braking of the automobile, the force acts substantially at the bottom of the wheel due to a temporal integration of the wheel and the suspension system by the brake means as acting below the lower arm, for discriminating between those two kinds of forces.

In the rear suspension system of the above-mentioned construction, said at least one bush may have an even lower modulus of elasticity along said first inclination as said first inclination is steeper against horizontality.

In the rear suspension system of the above-mentioned construction, said at least one bush may be substantially made of a rubber material, and the modulus of elasticity thereof along said first inclination may be made lower than that along said second inclination by a part of the bush to bear a force acting along said first inclination being devoid of the rubber material.

In the rear suspension system of the above-mentioned construction, said at least one bush may be an annular cylindrical rubber member coaxially interposed between a cylindrical outer housing portion constructing one of two pivoted members and a shaft portion constructing the other of said two pivoted members, and said part of the bush where the rubber material may be devoid is an arcuate portion coaxial to a central axis of the annular cylindrical configuration of said rubber member and positioned closer to said first inclination than to said second inclination.

In the rear suspension system of the above-mentioned construction, said arcuate part devoid of the rubber material may be formed as a pair symmetrical around the central axis of said rubber member.

BRIEF DESCRIPTION OF THE DRAWING

In the accompanying drawings.

DESCRIPTION OF THE EMBODIMENT

In the following, the present invention will be described in more detail with respect to an embodiment thereof with reference to the accompanying drawings.

Figure 1:
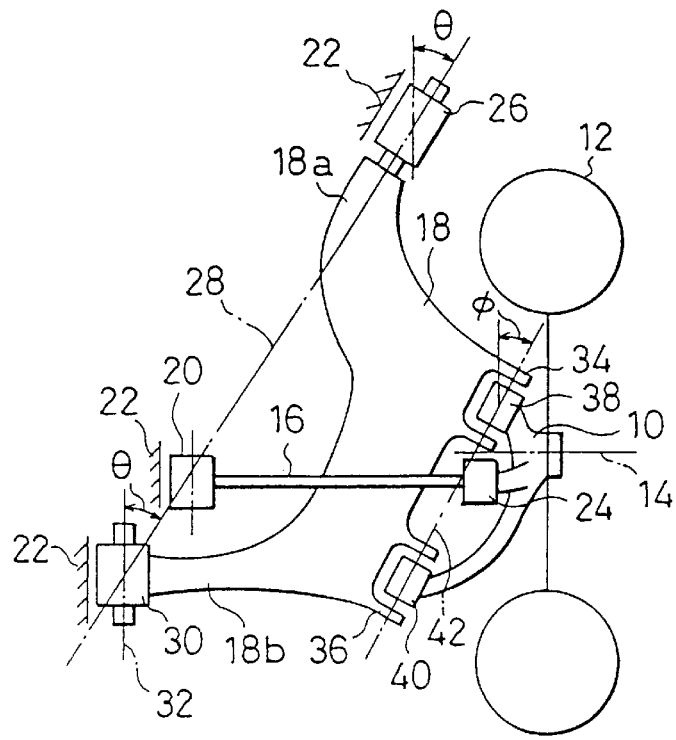
FIG. 1 is a somewhat diagrammatical plan view of an embodiment of the suspension system for a rear right wheel, in which the present invention is incorporated.
Figure 3:
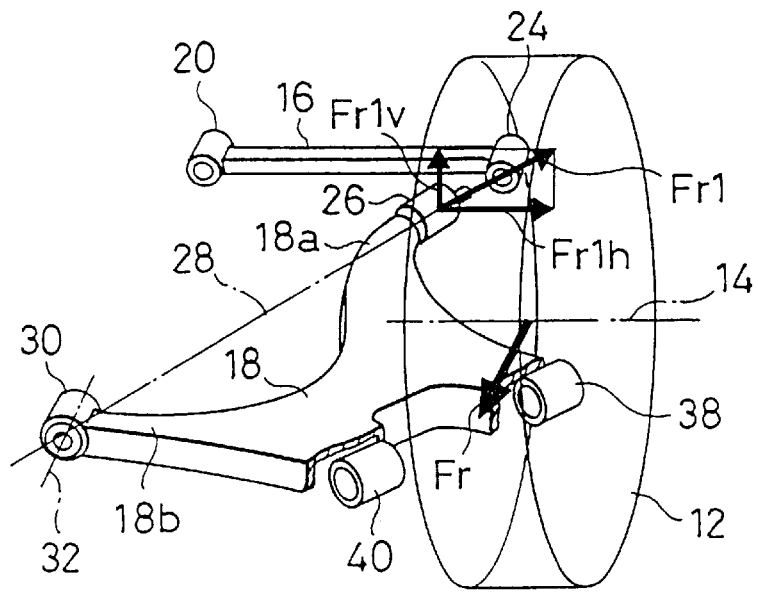
FIG. 3 is a somewhat diagrammatical perspective view of the suspension system shown in FIG. 1, with illustration of an analysis of a backward force acting therein due to an irregularity of road surface.

As described above, the present invention relates to a suspension system having a basic construction such as shown in FIGS. 1 and 3 in a plan and a perspective view, respectively. As already partly described, the suspension system therein shown constructed for suspending a rear right wheel 12 comprises an axle hub 10 including a rotatable axle (aligned to axis 14 but not shown) for supporting the rear right wheel 12 and a brake means (not shown) for selectively braking rotation of the axle. The suspension system further comprises a substantially horizontal lower arm 18 having front and rear inboard ends 18a, 18b each pivotably connected with a vehicle frame 22 via pivot joints 26 and 30 so as to allow a relative pivotal movement therebetween around a substantially horizontal common pivot axis 28 connecting central points of the front and rear inboard pivot joints 26 and 30. Each of the pivot joints 26 and 30 comprises an outer cylindrical housing portion firmly connected with the vehicle frame 22, a shaft portion forming an integral part of the inboard end of the lower arm 18 and received in the outer housing portion, and an annular cylindrical elastic bush coaxially interposed between the outer housing portion and the shaft portion, as described in detail hereinbelow. The rear inboard pivot joint 30 is positioned substantially inboard relative to the front inboard pivot joint 26 such that the common pivot axis 28 is inclined relative to the longitudinal direction of the automobile, which is vertical as viewed in FIG. 1, to make an angle of inclination θ thereagainst. The front inboard pivot joint 26 has a pivot axis aligned with the common pivot axis 28, while the rear inboard pivot joint 30 has a pivot axis 32 aligned with the longitudinal direction of the automobile, for the reasons described in the description of the prior art.

The lower arm 18 has front and rear outboard ends pivotably connected with the axle hub 10 via pivot joints 34, 38 and 36, 40 at a position below the axle so as to allow a relative pivotal movement therebetween around a substantially horizontal common pivot axis 42. Each of the front and rear outboard pivot joints has a similar construction as the front and rear inboard pivot joints, including an outer housing portion provided on the side of 38 or 40, a shaft portion bridged between a pair of lug portions provided on the side of 34 or 36 and passed through the housing portion, and an annular cylindrical elastic bush coaxially interposed between the housing portion and the shaft portion, as also described in detail hereinbelow. Further, the front outboard pivot joint 34, 38 is also shifted outboard relative to the rear outboard pivot joint 36, 40 such that the common pivot axis 42 makes a substantial angle of inclination φ against the longitudinal direction of the automobile.

The suspension system further comprises a substantially horizontal upper arm 16 having an outboard end pivotably connected with the axle hub 10 via a pivot joint 24 so as to allow a relative pivotal movement therebetween around a substantially horizontal pivot axis and an inboard end pivotably connected with the vehicle frame 22 via a pivot joint 20 so as to allow a relative pivotal movement therebetween around a substantially horizontal pivot axis, with incorporation of similar elastic bushes in the pivot joints.

The elastic annular cylindrical bushes each allow a slight elastic resiliency of the joint in three dimensional directions, i.e. a first direction aligned with a central axis of its annular cylindrical configuration and second and third directions each perpendicular to one another and to said first direction.

Figure 2:
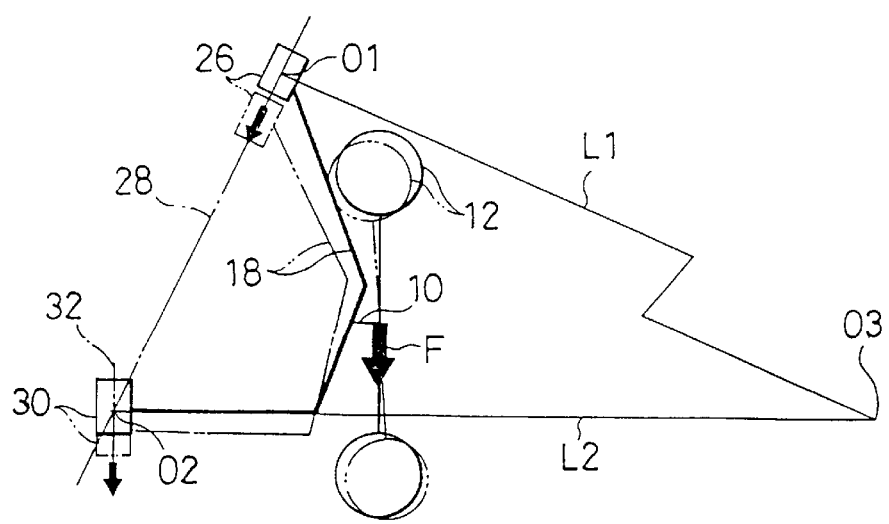
FIG. 2 is a diagram illustrating a toe-in increasing movement of the suspension system shown in FIG. 1 due to a backward force applied to the wheel.

As already described, when the wheel 12 is applied with a backward force F as shown in FIG. 2, the front and rear inboard pivot joints 26 and 30 are primarily biased along their pivoting axes 28 and 32, respectively, so that the wheel 12 is turned around a point O3 which is an intersection of a perpendicular L1 drawn from the center O1 of the joint 26 against the pivot axis 28 thereof and a perpendicular L2 drawn from the center O2 of the joint 30 against the pivot axis 32 thereof, thereby generating a toe-in increase of the wheel 12, provided that no compensation is made thereagainst.

When the backward force is applied by an irregularity of the road surface, the force acts substantially at the axle, i.e. at the central axis 14 of the wheel 12. Therefore, looking at the front inboard pivot joint 26 positioned below the central axis 14, the force acting at the wheel central axis 14 as Fr as shown in FIG. 3 generates, in addition to the force acting along the pivot axis 28 as shown in FIG. 2, a vertically upward directed force Fr1v to act at the joint 26 due to a vertical displacement between the axis 14 and the joint 30 and a horizontally directed force Fr1h to act at the joint 26 due to a horizontal displacement between the axial center of the wheel 12 and the joint 30, thereby generating a resultant force Fr1 acting at the joint 26 along an inclination against horizontality of ascending toward outboard, as illustrated in FIG. 3.

Figure 4A:
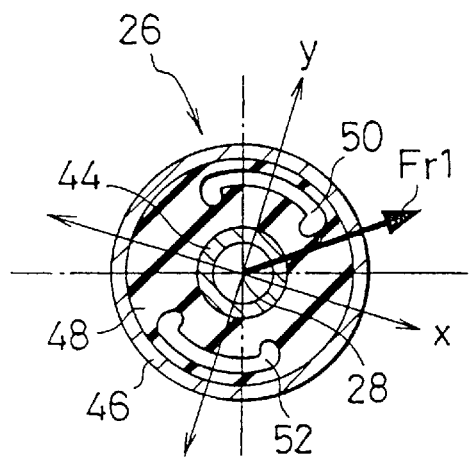
FIG. 4A is a cross sectional view of one of the pivot joints incorporated in the suspension system shown in FIGS. 1–3, showing an embodiment thereof, with illustration of an analysis of force corresponding to that of FIG. 3.
Figure 4B:
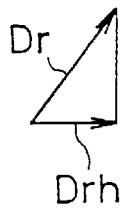
FIG. 4B is a vector diagram related with the force analysis of FIG. 4A.

FIG. 4A shows a cross section of the joint 26, wherein the joint is constructed by a cylindrical outer housing portion 46 fixed to the vehicle frame 22, an inner shaft portion 44 integral with or fixed to the inboard end 18a of the lower arm 18 and received in the outer housing portion, and an annular cylindrical elastic bush 48 coaxially disposed between the outer housing portion 46 and the inner shaft portion 44. The annular cylindrical elastic bush 48 made of an elastic material such as rubber is formed with a pair of coaxial arcuate spaces 50, 52 devoid of the elastic material such that the modulus of elasticity in a diametrical inclination y centrally traversing the pair of devoid spaces is low relative to that in a diametrical inclination x perpendicular to the inclination y, wherein the inclination y is inclined against horizontality to ascend toward outboard or descend toward inboard. Therefore, when the resultant force Fr1 acts in the direction to ascend toward outboard as shown in FIG. 3 or 4A, the force is reacted with a relatively low modulus of elasticity of the elastic bush 48, so as to generate a relatively large biasing Dr of the shaft portion 44 relative to the outer housing portion 46, as shown in FIG. 4B, thereby generating a correspondingly relatively large outboard biasing Drh of the front inboard end of the lower arm 18. The outboard biasing Drh of the front inboard end of the lower arm 18 generates a corresponding turn of the lower arm 18 around the rear inboard end thereof, i.e. a corresponding toe-out turn of the wheel 12, so as to cancel the toe-in turn of the wheel 12 illustrated in FIG. 2.

Therefore, by appropriately designing the geometry of the suspension system and the cross sectional non-uniformity of modulus of elasticity of the elastic bush 48 of the joint 26, the suspension system can have a steering alignment performance immune to an input of backward force to the wheel 12 by irregularities of road surface. In this connection, it will be noted further that, when the inclination y of the lowest modulus of elasticity is appropriately determined relative to an average inclination of the resultant force Fr1 such that the inclination y is on a steeper side of the average inclination of Fr1, the suspension system is made more soft in vertical directions as the irregular force input to the wheel has a larger vertical component, thereby improving the performance of the suspension system more adaptable to vertical irregularities of the road surface, while ensuring the normal firmness of suspension.

Figure 5:
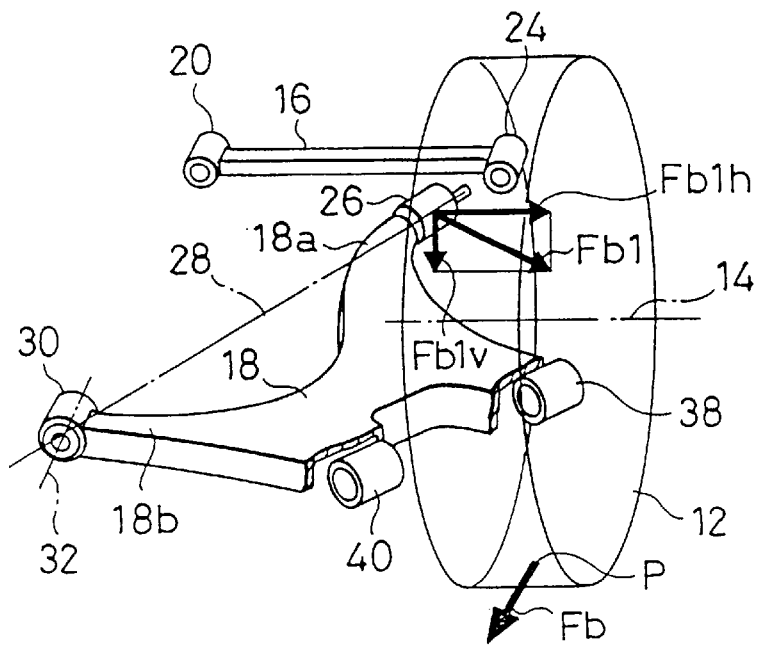
FIG. 5 is a view similar to FIG. 3, with illustration of an analysis of a backward force acting therein due to a braking of the automobile.
Figure 6A:
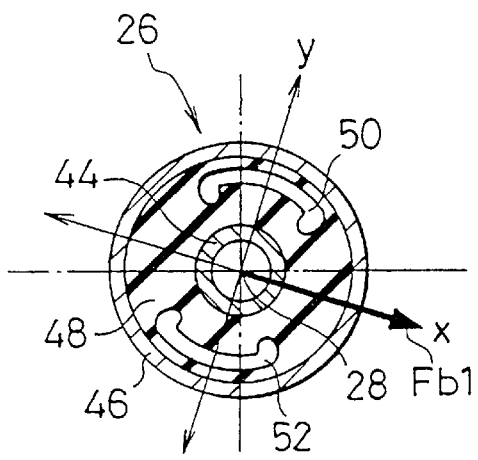
FIG. 6A is a cross sectional view similar to FIG. 4A, illustrating an analysis of force acting therein corresponding to that of FIG. 5.
Figure 6B:
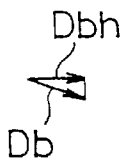
FIG. 6B is a vector diagram related with the force analysis of FIG. 6A.

When the automobile is braked, a backward force thereby applied to the wheel 12 acts substantially at the bottom of the wheel as a force Fb as illustrated in FIG. 5, because of an integration of the wheel 12 and the axle hub 10 by a braking mechanism. Therefore, looking at the front inboard pivot joint 26, the force Fb generates, in addition to the force acting along the pivot axis 28 as shown in FIG. 2, a vertically downward directed force Fb1v to act at the joint 26 due to a vertical displacement between the bottom of the wheel and the joint 30 and a horizontal force Fb1h to act at the joint 26 due to a horizontal displacement between the axial center of the wheel 12 and the joint 30, thereby generating a resultant force Fb1 acting at the joint 26 along an inclination of descending toward outboard, as illustrated in FIG. 5. Therefore, when the geometry of the suspension system is so determined that the inclination of the resultant force Fb1 substantially aligns with the inclination x in which the modulus of elasticity of the elastic bush 48 is the largest, as shown in FIG. 6A, the biasing Db of the shaft portion 44 relative to the outer housing portion 46 is held very small as illustrated in FIG. 6B, so that the corresponding outboard biasing Dbh of the front inboard end of the lower arm 18 is so small not to substantially cancel the toe-in increase of the wheel 12 available by the turning of the wheel around the point O3 as shown in FIG. 2.

Thus, it will be appreciated that the suspension system having the construction shown in the figures can operate with a steering alignment performance discriminative of irregularities of road surface and braking of the automobile, so as to be substantially immune to the irregularities of road surface, while generating an appropriate toe-in increase of the wheel when subjected to a braking, so as to compensate for a reduction of the load on the rear wheels caused by a forward shifting of the load balance on the four wheels due to the braking, when at least the bush of front outboard pivot joint 26 is arranged to have a non-uniformity of modulus of elasticity as viewed in the cross section perpendicular to the pivot axis thereof such that the modulus of elasticity is lower along a first inclination against horizontality of ascending toward outboard than along a second inclination against horizontality of descending toward outboard.

Further, it will be appreciated that the force Fr shown in FIG. 3 and the force Fb shown in FIG. 5 also generate corresponding forces acting at the rear inboard pivot joint 30 in directions respectively opposite to those of the forces Fr1 and Fb1 acting at the joint 26, which, when the elastic bush of the joint 30 is constructed to exhibit the same non-uniformity of modulus of elasticity as the elastic bush 48 of the joint 26, show the relationship that the biasing due to irregularities of road surface is greater than the biasing due to braking, so that the biasing due to the irregularities of road surface cancels the toe-in increase shown in FIG. 2 more than the biasing due to braking. However, since, as will be appreciated from FIG. 1, the arm length which converts the force Fr or Fb into a turning moment of the lower arm 18 around the joint 26 is relatively short, while the arm length which converts said turning moment around the joint 26 into the force to act at the joint 30 is relatively large, the effect of the Force Fr or Fb in canceling or not canceling the toe-in increase shown in FIG. 2 through this route will be much less as compared with that effected through the turning of the lower arm 18 around the joint 30.

Figure 7:
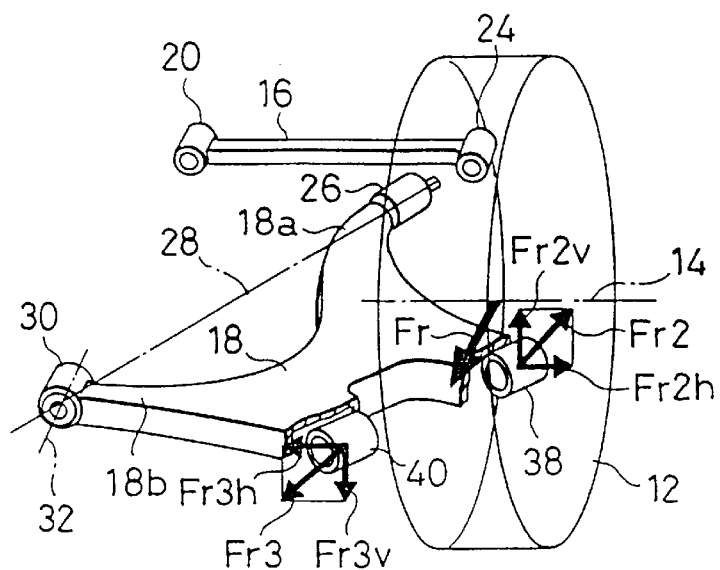
FIG. 7 is a view similar to FIG. 3, illustrating other analyses of a backward force acting therein due to an irregularity of road surface.

FIG. 7 is a view similar to FIG. 3, illustrating forces to act at the front and rear outboard pivot joints 34, 38 and 36, 40, with tearing off of the lug portions 34 and 36 for the purpose of clearer illustration, in the case that a backward force Fr is applied to the wheel 12 as acting at the central axis thereof due to irregularities of road surface. In the same manner as described with respect to the front inboard pivot joint 26 with reference to FIG. 5, the force Fr generates a vertically upward directed force Fr2v and a horizontally outboard directed force Fr2h at the front outboard pivot joint 34, 38 as a reaction thereto, thereby generating a resultant force Fr2 acting along an inclination against horizontality of ascending toward outboard. Similarly, looking at the rear outboard pivot joint 36, 40, the force Fr generates a vertically downward directed force Fr3v and a horizontally inboard directed force Fr3h at the rear outboard pivot joint 36, 40 as a reaction thereto, thereby generating a resultant force Fr3 acting along an inclination of descending toward inboard.

Figure 8A:
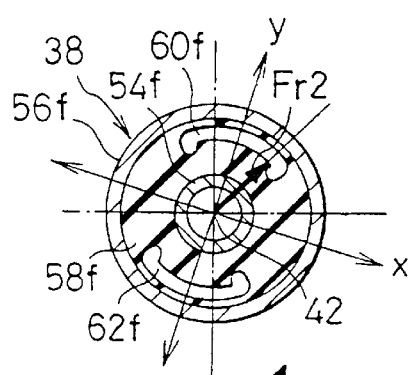
FIGS. 8A and 8B are views similar to FIG. 4, illustrating analyses of forces acting therein corresponding to those of FIG. 7.
Figure 8C:
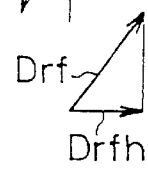
FIGS. 8C and 8D are vector diagrams related with the force analyses of FIGS. 8A and 8B, respectively.
Figure 8B:
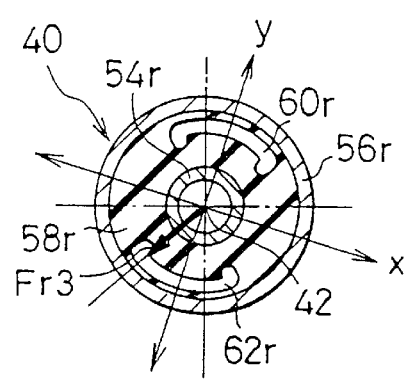
Figure 8D:
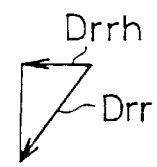

Therefore, when, as shown in FIGS. 8A and 8B, either or both of elastic bushes 58f and 58r each having similar annular cylindrical configuration to be coaxially interposed between similar outer housing portions 56f and 56r provided on the side of 38 and 40 and shaft portions 54f and 54r provided on the side of 34 and 36 are constructed to exhibit a similar cross sectional non-uniformity of modulus of elasticity with pairs of coaxial spaces 60f, 62f and 60r, 62r being formed along a similar inclination y as described above against the inclination x perpendicular thereto, the resultant force Fr2 and/or Fr3 will generate a correspondingly relatively large skewed biasing Drf and/or Drr of the shaft portions 54f and 54r relative to the outer housing portions 56f and 56r, respectively, thereby generating a correspondingly relatively large outboard or inboard biasing Drfh or Drrh of the front outboard end or the rear outboard end of the lower arm 18, as shown in FIG. 8C or 8D, both contributing to canceling the toe-in increase of the wheel according to the mechanism illustrated in FIG. 2, thereby making the suspension system to be substantially immune to irregularities of road surface with respect to the wheel alignment.

Figure 9:
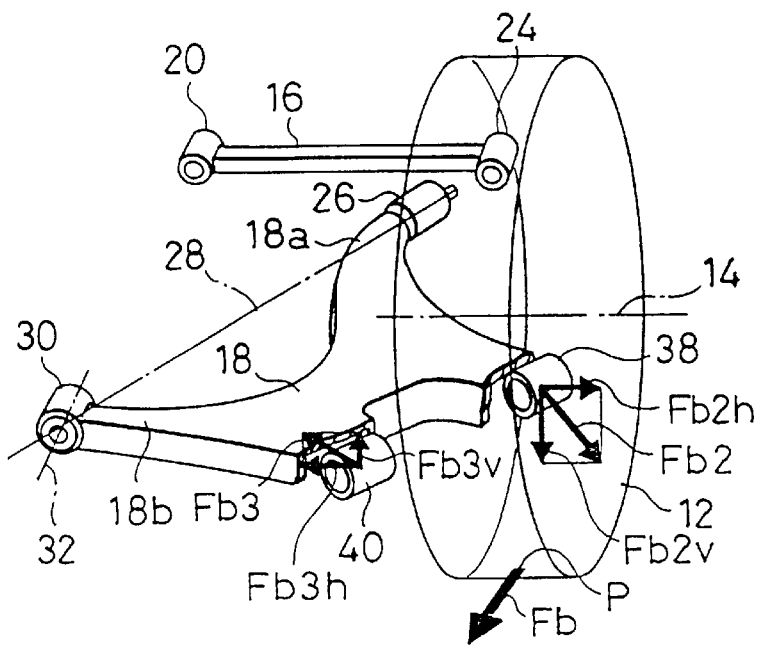
FIG. 9 is a view similar to FIG. 7, illustrating other analyses of a backward force acting therein due to a braking of the automobile.

On the other hand, when the wheel is braked, as shown in FIG. 9 illustrating forces to act at the front and rear outboard pivot joints 34, 38 and 36, 40 in a manner similar to FIG. 7, a backward force Fb applied to the wheel 12 as acting at the bottom thereof generates a vertically downward directed force Fb2v and a horizontally outboard directed force Fb2h at the front outboard pivot joint 34, 38 as a reaction thereto, thereby generating a resultant force Fb2 acting along an inclination against horizontality of descending toward outboard. Similarly, looking at the rear outboard pivot joint 36, 40, the force Fb generates a vertically upward directed force Fb3v and a horizontally inboard directed force Fb3h at the rear outboard pivot joint 36, 40 as a reaction thereto, thereby generating a resultant force Fb3 acting along an inclination against horizontality of ascending toward inboard.

Figure 10A:
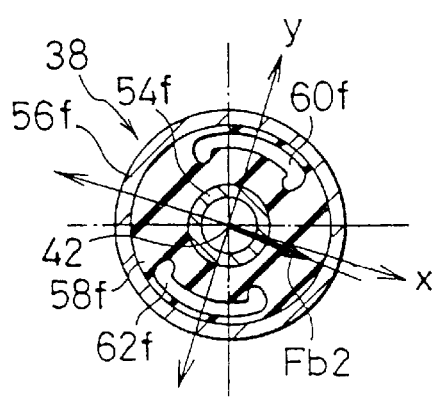
FIGS. 10A and 10B are views similar to FIGS. 8A and 8B, illustrating analyses of forces acting therein corresponding to those of FIG. 9.
Figure 10B:
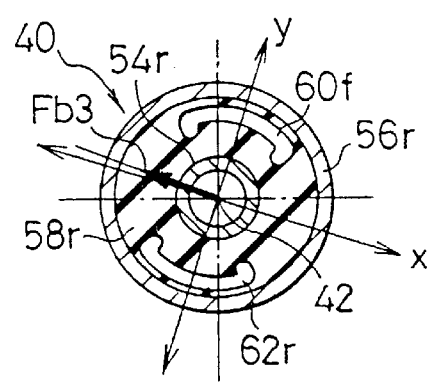
Figure 10C:
FIGS. 10C and 10D are vector diagrams related with the force analyses of FIGS. 10A and 10B, respectively.
Figure 10D:

Therefore, as shown in FIGS. 10A and 10B, the resultant force Fb2 and/or Fb3 will generates only a small skewed biasing Dbf and/or Dbr of the shaft portions 54f and 54r relative to the outer housing portions 56f and 56r, respectively, thereby generating only a small corresponding outboard or inboard biasing Dbfh or Dbrh of the front outboard end or the rear outboard end of the lower arm 18, as shown in FIG. 10C or 10D, both not substantially canceling the toe-in increase of the wheel according to the mechanism illustrated in FIG. 2, thereby making the suspension system to be substantially responsive to the braking of the wheel with respect to the wheel alignment thereof.

It will be appreciated that the present invention is substantially operable when at least one of the bushes incorporated in the front inboard pivot joint 26 and the front and rear outboard pivot joints 34, 38 and 36, 40 is constructed to have the non-uniformity of modulus of elasticity as described above. With respect to the bush of the rear inboard pivot joint 30, it is not ineffective to incorporate the non-uniformity of modulus of elasticity. However, since its effectiveness is considered to be generally substantially low as compared with the above-mentioned three joints, the invention is defined to be incorporated in at least one of those three bushes, though it is not intended that the joint 30 is positively excluded.

Although the invention has been described in detail with respect to an embodiment thereof operative in several different manners according to various options regarding the design thereof, it will be apparent for those skilled in the art that various modifications are possible with respect to the shown embodiment without departing from the spirit of the present invention.

What is claimed is:

1. A rear suspension system of an automobile, comprising:
   an axle hub including a rotatable axle for supporting either a rear right or a rear left wheel and a brake means for selectively braking rotation of said axle;
   a substantially horizontal lower arm having front and rear outboard ends each pivotably connected with said axle hub at a position below said axle via a pivot joint so as to allow a relative pivotal movement therebetween around a substantially horizontal common pivot axis connecting central points of said front and rear outboard pivot joints, and front and rear inboard ends each pivotably connected with a vehicle frame via a pivot joint so as to allow a relative pivotal movement therebetween around a substantially horizontal common pivot axis connecting central points of said front and rear inboard pivot joints, said rear inboard pivot joint being positioned substantially inboard relative to said front inboard pivot joint, said front inboard pivot joint having a pivot axis substantially aligned with said common pivot axis connecting the central points of said front and rear inboard pivot joints, while said rear inboard pivot joint having a pivot axis substantially extending in the longitudinal direction of the automobile, with each of said pivot joints including an elastic bush allowing a slight elastic resiliency in three dimensional directions; and
   a substantially horizontal upper arm having an outboard end pivotably connected with said axle hub via a pivot joint so as to allow a relative pivotal movement therebetween around a substantially horizontal pivot axis and an inboard end pivotably connected with the vehicle frame via a pivot joint so as to allow a relative pivotal movement therebetween around a substantially horizontal pivot axis;
   wherein at least one of said bushes of said front inboard pivot joint and said front and rear outboard pivot joints of said lower arm has a non-uniformity of modulus of elasticity as viewed in a cross section perpendicular to the pivot axis thereof such that the modulus of elasticity is lower along a first inclination against horizontality of ascending toward outboard than along a second inclination against horizontality of descending toward outboard.

2. A rear suspension system according to claim 1, wherein said at least one bush has an even lower modulus of elasticity along said first inclination as said first inclination is steeper against horizontality.

3. A rear suspension system according to claim 1, wherein said at least one bush is substantially made of a rubber material, and the modulus of elasticity thereof along said first inclination is made lower than that along said second inclination by a part of the bush to bear a force acting along said first inclination being devoid of the rubber material.

4. A rear suspension system according to claim 3, wherein said at least one bush is an annular cylindrical rubber member coaxially interposed between a cylindrical outer housing portion constructing one of two pivoted members and a shaft portion constructing the other of said two pivoted members, and said part of the bush where the rubber material is devoid is an arcuate portion coaxial to a central axis of the annular cylindrical configuration of said rubber member and positioned closer to said first inclination than to said second inclination.

5. A rear suspension system according to claim 4, wherein said arcuate part devoid of the rubber material is formed as a pair symmetrical around the central axis of said rubber member.

* * * * *